United States Patent [19]

Sutton et al.

[11] 3,911,119

[45] Oct. 7, 1975

[54] ANTI-ARTHRITIC COMPOSITIONS COMPRISING LARGE RING GOLD-SULFUR-PHOSPHINE CHELATES AND METHODS OF PRODUCING ANTI-ARTHRITIC ACTIVITY

[75] Inventors: Blaine M. Sutton, Hatboro; Joseph Weinstock, Phoenixville, both of Pa.

[73] Assignee: Smithkline Corporation, Philadelphia, Pa.

[22] Filed: July 17, 1974

[21] Appl. No.: 489,211

Related U.S. Application Data

[62] Division of Ser. No. 384,665, Aug. 1, 1973, Pat. No. 3,842,108.

[52] U.S. Cl. ............................... 424/209; 424/290
[51] Int. Cl.$^2$ .................. A61K 31/66; A61K 31/28
[58] Field of Search ............ 424/287, 290; 260/430

*Primary Examiner*—Stanley J. Friedman
*Attorney, Agent, or Firm*—Janice E. Williams; Alan D. Lourie; William H. Edgerton

[57] ABSTRACT

Large ring gold-sulfur-phosphine chelates having anti-arthritic activity are prepared by reaction of an appropriate thioalkylphosphine with a phosphine gold halide in the presence of alkali.

8 Claims, No Drawings

ANTI-ARTHRITIC COMPOSITIONS COMPRISING LARGE RING GOLD-SULFUR-PHOSPHINE CHELATES AND METHODS OF PRODUCING ANTI-ARTHRITIC ACTIVITY

This is a division of application Ser. No. 384,665 filed Aug. 1, 1973, now U.S. Pat. No. 3,842,108.

This invention relates to novel large ring gold-sulfur-phosphine chelates which have useful pharmacological activity. More specifically, the compounds of this invention have anti-arthritic activity as measured by their ability to inhibit adjuvant-induced polyarthritis in rats.

The compounds of this invention are represented by the following structural formula:

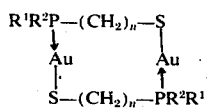

FORMULA I in which:

R[1] and R[2] are each lower alkyl of from one to three carbon atoms, phenyl, phenyl substituted with a member selected from the group of alkyl, alkoxy or halogen, each alkyl or alkoxy having from one to three carbon atoms, or, when lower alkyl, are joined together with the phosphorus atoms to which they are attached to form a ring; and $n$ is two to four.

Preferred compounds of this invention are represented by Formula I where R[1] and R[2] are lower alkyl of from one to three carbon atoms and $n$ is two.

The compounds of this invention are prepared by reaction of an appropriate substituted thioalkylphosphine with a phosphine gold halide, for example chloro(triethylphosphine)-gold, in the presence of alkali such as sodium or potassium hydroxide in a solvent such as aqueous alcohol at about 25° for approximately 1 hour.

The phosphine gold halides employed as starting materials are prepared by reaction of a cold (−10° to −5°) solution of gold (I) chloride, prepared by mixing thiodiglycol and gold acid chloride trihydrate in aqueous alcohol, with an appropriate phosphine such as triethylphosphine. Other procedures which may be applied to the preparation of these intermediates are found in *J. Chem. Soc.* 1828 (1937) and 1235 (1940) and *Australian J. Chem.* 19:547 (1966).

The substituted thioalkylphosphines are prepared as described in French Pat. No. 1,401,930 [C.A. 63:11615h (1965)] from reaction of a phosphine, for example diethylphosphine, with an alkylene sulfide such as ethylene sulfide and sodium in liquid ammonia or phenyl lithium. Alternatively, the substituted thioalkyl phosphines are prepared by irradiation of a mixture of the corresponding substituted alkenyl phosphine, for example allyldiethylphosphine, and thiolacetic acid followed by basic hydrolysis of the intermediate thioacetate to the desired thiol. The substituted alkenyl phosphines are either known or are prepared from reaction of an alkenyl magnesium halide with a substituted chlorophosphine such as diethylchlorophosphine [*J. Chem. Soc.* 1446 (1947), 411 (1951)]. Other procedures which may be used to prepare the alkenyl phosphines are found in German Pat. No. 2,057,771 [*C.A.*75:49333y (1971)] and *Chem. Ber.* 92:2088 (1959).

The anti-arthritic activity of the compounds of this invention is measured by their ability to inhibit adjuvant-induced polyarthritis in rats. The compounds of Formula I produce marked inhibition of the development of adjuvant arthritis in rats at daily oral doses as low as about 18 mg. per kilogram of body weight. Of particular importance is the attainment of significant serum levels of gold following oral administration of these doses.

Adjuvant arthritis in rats is produced by a single injection of 0.75 mg. of *Mycobacterium butyricum* suspended in white paraffin (N.F.) into a hindpaw (left footpad). The injected leg becomes inflamed and reaches a maximum volume in 3 to 5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention are administered in conventional dosage unit forms by incorporating an amount sufficient to produce anti-arthritic activity, without toxic effects, with a nontoxic pharmaceutical carrier according to accepted procedures. Preferably the dosage units will contain a gold-sulfur-phosphine chelate of Formula I in an amount of from about 0.5 mg. to about 25 mg., preferably 0.5 mg. to 10 mg. calculated on gold content, per unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly, the carrier or diluent can include any time dealy material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The method of producing anti-arthritic activity in accordance with this invention comprises administering internally to an animal organism a gold-sulfur-phosphine chelate of Formula I, usually combined with a pharmaceutical carrier, in an amount sufficient to produce anti-arthritic activity without limiting side effects. The active medicament will be administered in a dosage unit, as described above, orally or parenterally, the oral route being preferred. Advantageously equal doses will be administered one or two times daily with the daily dosage regimen being from about 0.5 mg. to about 25 mg., preferably 0.5 mg. to about 10 mg., calculated on gold content. When the method described above is carried out, anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of this invention and their incorporation into pharmaceutical compositions, and as such are not to be considered as limiting the invention set forth in the claims appended hereto. Temperatures are in degrees Centigrade unless otherwise stated.

EXAMPLE 1

Di-$\mu$-(diethylphosphinoethylthio)digold

A solution of 10.0 g. (0.08 mol.) of thiodiglycol in 25 ml. of ethanol was mixed with a solution of 15.76 g. (0.04 mol.) of gold acid chloride trihydrate in 75 ml. of distilled water. When the bright orange-yellow solution was almost colorless, it was cooled to below —5° and an equally cold solution of 5.0 g. (0.0425 mol.) of triethylphosphine in 25 ml. of ethanol was added dropwise to the stirred solution. After addition, the cooled mixture was stirred for 30 minutes. The solid that separates was removed by filtration and the filtrate was concentrated to about 30 ml. to yield a second crystal crop. The combined solid was washed with aqueous ethanol (2:1) and recrystallized from ethanol by addition of water to the cloud point to give chloro(triethylphosphine)gold as white needles, m.p. 85°–86°.

To a solution of 8.5 g. (0.37 mol.) of sodium in 500 ml. of liquid ammonia under nitrogen is added 7 g. (0.41 mol) of diethylphosphine. After 20 minutes a solution of 22 g. (0.38 mol.) of ethylene sulfide in 25 ml. of ether is added dropwise. The ammonia is then removed and the residue is treated with 250 ml. of ether and 250 ml. of aqueous ammonium chloride. The ether layer is dried, filtered through Linde molecular sieves, evaporated and the residue is distilled to give diethyl(2-thioethyl)phosphine, b.p. 43°–44° (0.001 mm.).

To a solution of 8.50 g. (0.0565 mol.) of diethyl(2-thioethyl)phosphine in 40 ml. of ethanol was added a solution of 2.26 g. (0.0565 mol.) of sodium hydroxide in 40 ml. of 1:1 water-ethanol followed by a solution of 19.8 g. (0.056 mol.) of chloro(triethylphosphine)gold in 60 ml. of 2:1 chloroform-ethanol. After stirring for 1 hour, the solution was filtered and evaporated to dryness and the residue was extracted with about 200 ml. of chloroform. The extract was dried and concentrated in vacuo to gove a yellow oil which crystallized upon cooling. The solid was washed with ether and recrystallized from methanol to give the title compound, m.p. 136°–138°.

EXAMPLE 2

Di-$\mu$-(diethylphosphinobutylthio)digold

To a solution of a Grignard reagent prepared from 67.5 g. (0.50 mol.) of 4-bromo-1-butene and 14.6 g. (0.60 g.-atom) of magnesium turnings in 400 ml. of dry ether is slowly added under nitrogen a solution of 62.5 g. (0.05 mol.) of diethylchlorophosphine in 500 ml. of dry benzene. The reaction mixture is refluxed for 2 hours, then cooled under nitrogen and hydrolyzed with saturated aqueous ammonium chloride. The layers are separated and the organic layer is dried and distilled to give diethyl(4-butenyl)phosphine as a colorless liquid.

A solution of 14.5 g. (0.10 mol.) of diethyl(4-butenyl)phosphine and 8.4 g. (0.11 mol.) of thiolacetic acid in 50 ml. of carbon tetrachloride is irradiated in a Pyrex flask with a mercury vapor lamp for 1.5 to 2 hours under a nitrogen atmosphere. The reaction mixture is distilled to give diethyl(4-acetylthiobutyl)phosphine as a liquid.

A solution of 1.0 g. (0.025 mol.) of sodium hydroxide in 20 ml. of 50 percent aqueous ethanol and a solution of 5.5 g. (0.025 mol.) of diethyl(4-acetylthiobutyl)phosphine and 8.75 g. (0.025 mol.) of chloro(triethylphosphine)gold in 30 ml. of chloroform-ethanol (2:1) are stirred under nitrogen for 1 hour at 25°. The reaction mixture is evaporated to dryness, chloroform is added to the residue and the chloroform solution is washed with water and concentrated to give the title compound.

EXAMPLE 3

Di-$\mu$-(diphenylphosphinopropylthio)digold

The title compound is prepared by irradiation of 22.6 g. (0.10 mol.) of allyldiphenylphosphine and 8.4 g. (0.11 mol.) of thiolacetic acid followed by basic hydrolysis of the intermediate thioacetate and reaction of the thiol with chloro(triethylphosphine)gold as described in the procedure of Example 2.

EXAMPLE 4

Dimethyl(2-thioethyl)phosphine is prepared from dimethylphosphine and ethylene sulfide by the procedure of Example 1. When an equivalent amount of dimethyl(2-thioethyl)-phosphine is substituted in the procedure of Example 1 for diethyl(2-thioethyl)phosphine, di-$\mu$-(dimethylphosphinoethylthio)digold is obtained.

Similarly, methylethyl(2-thioethyl)phosphine is obtained from methylethylphosphine (U.S. Pat. No. 3,075,017) and ethylene sulfide. Substitution of an equivalent amount of methylethyl(2-thioethyl)phosphine in the procedure of Example 1 for diethyl(2-thioethyl)phosphine gives di-$\mu$-(methylethylphosphinoethylthio)digold.

In the same manner, diisopropyl(2-thioethyl)phosphine is obtained from ethylene sulfide and diisopropylphosphine [*J. Organometal. Chem.* 13:283 (1968)] and is substituted in the procedure of Example 1 for diethyl(2-thioethyl)phosphine to give di-$\mu$-(diisopropylphosphinoethylthio)digold.

EXAMPLE 5

To a solution of 37.2 g. (0.21 mol.) of diphenyl phosphine in 100 ml. of ether is added dropwise 200 ml. of 1M phenyl lithium solution, followed by a solution of 12 g. (0.20 mol.) of ethylene sulfide in 100 ml. of ether with cooling. The reaction mixture is stirred for 3 hours at 25° then 100 ml. of methanol and 50 ml. of saturated aqueous ammonium chloride solution are added. The ether layer is separated, washed, dried and distilled to give diphenyl(2-thioethyl)phosphine, b.p. 152°–153° (0.05 mm.).

When an equivalent amount of diphenyl(2-thioethyl)phosphine is substituted in the procedure of Example 1 for diethyl(2-thioethyl)phosphine, di-$\mu$-(diphenylphosphinoethylthio)digold is obtained.

Reaction of ethylphenylphosphine (U.S. Pat. No. 3,019,248) and ethylene sulfide as described in Example 1 or above gives ethylphenyl(2-thioethyl)phosphine. Substitution of an equivalent amount of ethylphenyl(2-thioethyl)phosphine in the procedure of Example 1 for diethyl(2-thioethyl)phosphine gives di-μ-(ethylphenylphosphinoethylthio)digold.

EXAMPLE 6

(2-Thioethyl)phospholane is prepared from phospholane (U.S. Pat. No. 3,086,056) and ethylene sulfide by the procedure of Example 1 or Example 5. When an equivalent amount of (2-thioethyl)phospholane is substituted in the procedure of Example 1 for diethyl(2-thioethyl)phosphine, di-μ-(phospholanoethylthio)digold is obtained.

In like manner, (2-thioethyl)phosphane is prepared from phosphane (U.S. Pat. No. 3,086,056) and ethylene sulfide. Substitution of an equivalent amount of (2-thioethyl)phosphane in the procedure of Example 1 for diethyl(2-thioethyl)phosphine gives di-μ-(phosphanoethylthio)digold.

EXAMPLE 7

When o-tolylphenylphosphine, p-tolylphenylphosphine, o-methoxyphenylphenylphosphine and o-chlorophenylphenylphosphine [*J. Chem. Soc.* 1327 (1963)] are allowed to react with ethylene sulfide by the procedure described in Example 1 or Example 5 the following 2-thioethyl phosphines are obtained:

o-tolylphenyl(2-thioethyl)phosphine
p-tolylphenyl(2-thioethyl)phosphine
o-methoxyphenylphenyl(2-thioethyl)phosphine
o-chlorophenylphenyl(2-thioethyl)phosphine.

Substitution of an equivalent amount of a 2-thioethyl phosphine listed above in the procedure of Example 1 for diethyl(2-thioethyl)phosphine gives the following gold-sulfur-phosphine complexes:

di-μ-(o-tolylphenylphosphinoethylthio)digold
di-μ-(p-tolylphenylphosphinoethylthio)digold
di-μ-(o-methoxyphenylphenylphosphinoethylthio)-digold
di-μ-(o-chlorophenylphenylphosphinoethylthio)-digold.

EXAMPLE 8

| Ingredients | Mg./Tablet |
|---|---|
| Di-μ-(diethylphosphinoethylthio)digold | 5 |
| Calcium sulfate, dihydrate | 150 |
| Sucrose | 25 |
| Starch | 15 |
| Talc | 5 |
| Stearic acid | 3 |

The sucrose, calcium sulfate and di-μ-(diethylphosphinoethylthio)digold are thoroughly mixed and granulated with hot 10 percent gelatin solution. The wetted mass is passed through a No. 6 mesh screen directly onto drying trays. The granules are dried at 120°F. and passed through a No. 20 mesh screen, mixed with the starch, talc and stearic acid and compressed into tablets.

In a similar manner, the other gold-sulfur-phosphine chelates disclosed herein may be formulated into tablets.

What is claimed is:

1. A pharmaceutical composition having anti-arthritic activity, in dosage unit form, comprising a pharmaceutical carrier and an anti-arthritically effective but nontoxic amount of a compound of the formula:

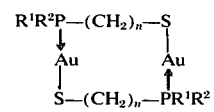

in which:

$R^1$ and $R^2$ are each lower alkyl of from one to three carbon atoms, phenyl, phenyl substituted with a member selected from the group of alkyl, alkoxy or halogen, each alkyl or alkoxy having from one to three carbon atoms, or, when lower alkyl, are joined together with the phosphorus atom to which they are attached to form a ring; and $n$ is two to four.

2. The composition of claim 1 in which $R^1$ and $R^2$ are lower alkyl of from one to three carbon atoms and $n$ is two.

3. The composition of claim 2 in which $R^1$ and $R^2$ are ethyl.

4. The composition of claim 1 in which the active medicament is in an amount of 0.5 mg. to about 25 mg., calculated on gold content, per dosage unit.

5. The method of producing anti-arthritic activity which comprises administering internally to an animal organism in need of said activity in an amount sufficient to produce said activity a compound as defined in claim 1.

6. The method of claim 5 in which $R^1$ and $R^2$ are lower alkyl of from one to three carbon atoms and $n$ is two.

7. The method of claim 6 in which $R^1$ and $R^2$ are ethyl.

8. The method of claim 5 in which the active medicament is administered in a daily dosage regimen of about 0.5 mg. to about 25 mg., calculated on gold content.

* * * * *

UNITED STATES PATENT AND TRADEMARK OFFICE
CERTIFICATE OF CORRECTION

PATENT NO. : 3,911,119
DATED : Oct. 7, 1975
INVENTOR(S) : Blaine M. Sutton and Joseph Weinstock It is certified that error appears in the above-identified patent and that said Letters Patent are hereby corrected as shown below:

Col. 1, line 37, "thylphosphine)-gold" should read --thylphosphine)gold--

Col. 3, line 33, "7 g." should read --37 g.--

Col. 4, line 33 "ethyl(2-thioethyl)-phosphine" should read --ethyl(2-thioethyl)phosphine--

Signed and Sealed this sixteenth Day of March 1976

[SEAL]

Attest:

RUTH C. MASON
Attesting Officer

C. MARSHALL DANN
Commissioner of Patents and Trademarks